Figure 1:
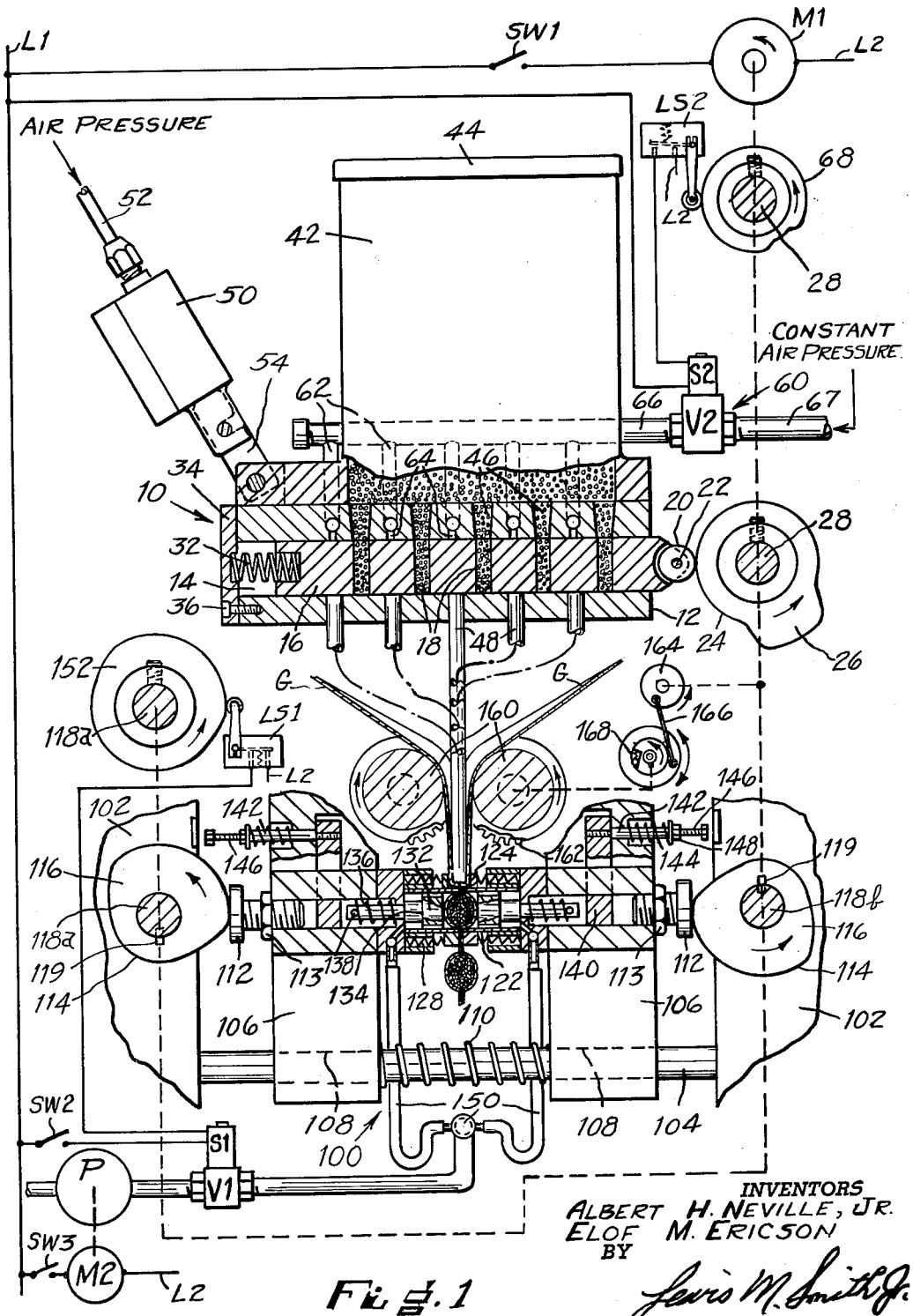

INVENTORS
ALBERT H. NEVILLE, JR.
ELOF M. ERICSON
BY
Lewis M. Smith Jr.
ATTORNEY

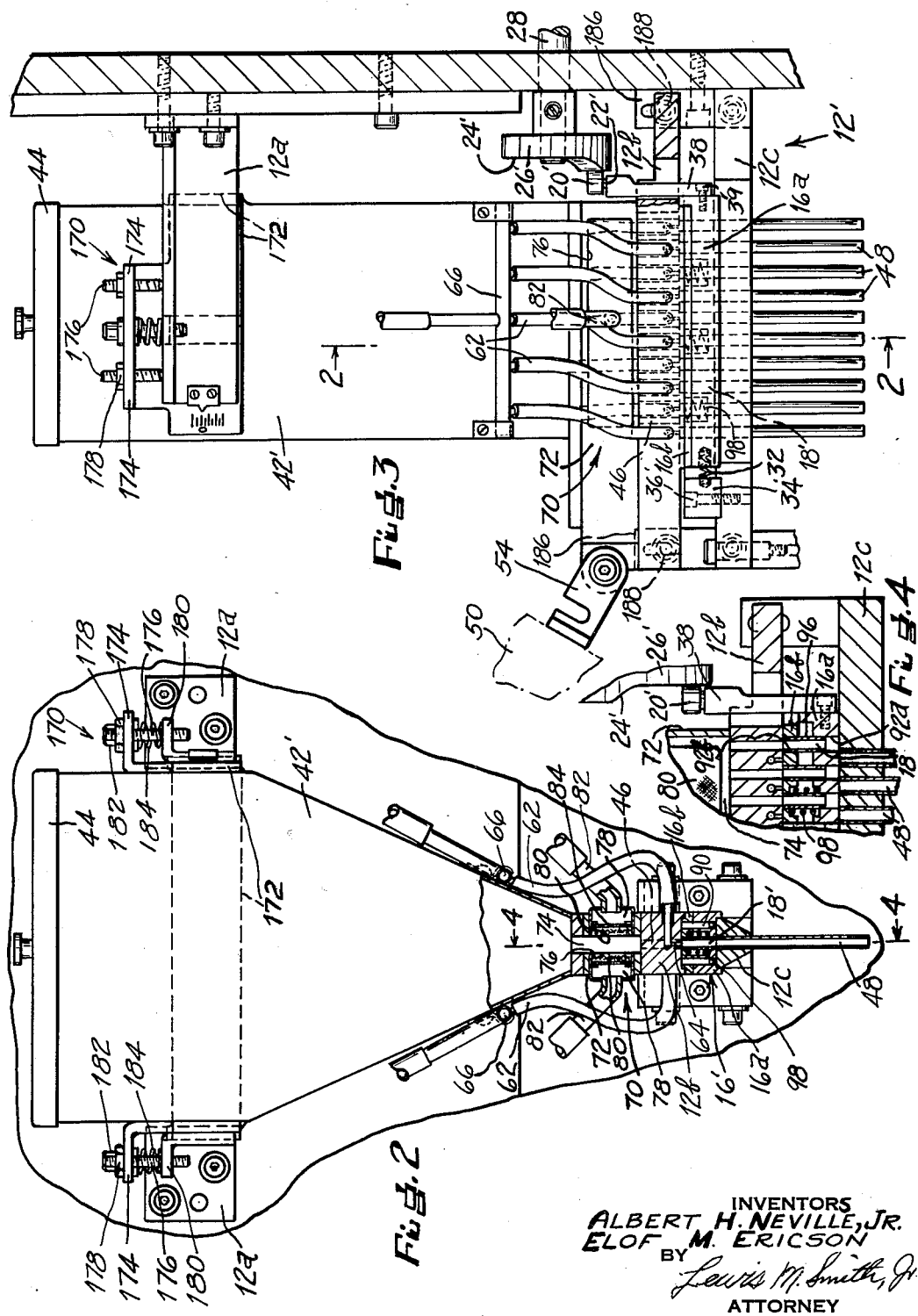

United States Patent Office 3,258,159
Patented June 28, 1966

3,258,159
METERING AND DISCHARGING APPARATUS
Albert H. Neville, Jr., and Elof M. Ericson, Worcester, Mass., assignors to Norton Company, Worcester, Mass., a corporation of Massachusetts
Filed June 2, 1964, Ser. No. 371,992
11 Claims. (Cl. 222—1)

The present invention relates to metering and discharging apparatus, and more particularly to apparatus for metering and discharging precisely controlled quantities of dry particulate material at a rapid cyclic rate.

While it will be evident from consideration of the following detailed description and the accompanying illustrations of the apparatus comprising the instant invention that this apparatus may be used for various different applications in which it is desirable to deliver successive precisely controlled quantities of a dry particulate material at a rapid rate, this apparatus has proved to be particularly useful for filling soft shelled gelatin capsules with pharmaceuticals consisting of dry particulate material or with other dry particulate material ranging in size from fine powders to generally spherical pellets having maximum dimensions of several hundredths of an inch.

Accordingly, for the purpose of illustration, the apparatus comprising the instant invention will be described in operative relation to the elements of an encapsulating machine with which it may coact to produce hermetically sealed soft shelled gelatin capsules filled with precisely controlled quantities of dry particulate material.

Briefly, the instant invention contemplates apparatus comprising a supporting means on which is mounted a container for a dry particulate material such as a powder or small pellets, and a metering or measuring member provided with one or more volumetric metering chambers and slidably mounted upon the supporting means for cyclic movement between a first position in which the metering chamber or chambers are filled with dry material from the container and a second position in which the quantity of dry material contained in each metering chamber is discharged therefrom into a tubular discharge member.

This apparatus also includes an agitating means continuously operable to keep the dry particulate material moving in such a way that it flows into and out of the metering chamber or chambers in the desired quantity without clogging the apparatus, and a pulsing means connected to the supporting means to discharge pressurized gas against the dry particulate material in the metering chamber or chambers when the metering chamber or chambers are aligned with the tubular discharge members. In addition, this apparatus includes a drive means operable to move the metering or measuring member back and forth between its first and second positions and to actuate the pulsing means cyclically in coordinated relation to the movement of the metering or measuring member.

As noted above, the instant invention finds one particularly useful application in combination with the type of encapsulating machine arranged to produce filled soft shelled gelatin capsules. A representative machine of this type is described and illustrated in Patent No. 2,-549,327, issued April 17, 1951, in which the apparatus embodying the instant invention may be installed so that it replaces the positive displacement metering pump of the type used for fluid fill such as the pump assembly 16 illustrated and described in Patent No. 2,549,327 or the valve and pump illustrated and described in Patent No. 2,638,052 issued May 12, 1953. For this application, it is also necessary to substitute a single set of opposed reciprocating capsule forming dies of the type illustrated in Patent No. 2,513,581, issued July 4, 1950, for the double set of opposed reciprocating capsule forming dies described and illustrated in Patent No. 2,549,327.

An object of this invention is the provision of apparatus for metering and discharging successive precisely controlled quantities of a given dry particulate material.

Another object is the provision of apparatus for metering and discharging precisely controlled quantities of a given dry particulate material within the range of sizes from a fine powder to substantially larger discrete pellets of dry material.

Still another object is the provision of apparatus including agitating means operable with various sizes of dry particulate material to assure the continuing movement of the dry material through this apparatus in the desired measured quantities.

Yet another object is the provision of apparatus for metering and discharging dry particulate material including means operable to assure discharge of the desired precisely controlled quantities at the desired time intervals.

A further object of this invention is the provision of apparatus for metering and discharging dry particulate material including a metering means selectively adjustable to vary the precisely controlled quantities of dry particulate material discharged as desired or required for a given application.

Other objects and advantages of the instant invention will be evident from careful consideration of the following detailed description of this invention and of the showing in the accompanying drawings wherein:

FIG. 1 is a simplified schematic representation, partially in section, of an embodiment of the instant invention suitable for metering and discharging relatively large dry pellets, also illustrating the operative relationship between the instant invention and the cooperating elements of a machine for making filled soft shelled gelatin capsules, FIG. 2 is a front elevation, partially sectioned substantially on line 2—2 of FIG. 4, of an embodiment of the instant invention suitable for metering and discharging very fine dry particles of the size generally referred to as powder, FIG. 3 is a side elevation of the embodiment of the instant invention illustrated in FIG. 2, and FIG. 4 is a partial vertical section taken on line 4—4 of FIG. 2 showing details of a measuring or metering member adjustable to vary the volume of the dry particulate material metered during each operating cycle.

Referring now to the drawings, wherein like reference numerals refer to like or corresponding parts, FIG. 1 includes a simplified schematic representation of one embodiment of a metering and discharging apparatus incorporating the instant invention, generally designated by the reference numeral 10. This apparatus includes a supporting member 12 provided with an elongated central opening 14 either formed integrally in the supporting member 12 as indicated in FIG. 1 or in a suitable elongated housing formed separately and fixedly secured to the supporting member 12. An elongated metering member 16 provided with one or more generally cylindrical transversely extended metering chambers 18 is mounted slidably within and in closely interfitted relationship with the central opening 14 so that its reciprocating movement may be controlled by a cam follower 20 rotatably supported on a pivot 22 at one end of the metering member 16 for engagement with the cam surface 24 of the driving cam 26 secured for rotation with a rotatable shaft 28 included in the drive train described further below. The displacement of the metering member 16 by the driving cam 26 is opposed by biasing spring 32 engaging the opposite end of the metering member 16 and constrained relative to the supporting member 12 in any suitable manner such as by the cover plate 34 secured to the supporting member by any suitable means such as a plurality of retaining screws 36.

The supporting member 12 also supports a suitable container 42 for the dry particulate material to be metered and discharged, which may be enclosed at the top with a suitable cover 44. The bottom of the container 42 is provided with an elongated slot aligned with a number of passages 46 through the supporting member 12 corresponding to the number of metering chambers 18 located so that the interior of the container 42 is connected to the respective metering chambers 18 by the cooperating passages 46 when the metering member 16 is disposed in its right hand position as shown in FIG. 1. With the metering member 16 so disposed the dry particulate material is delivered to each of the metering chambers 18 by gravity feed maintained by an agitating means described further below until each of the metering chambers 18 is completely filled with the desired amount of material.

The supporting member 12 is also provided with a number of elongated tubular discharge members or arbors 48 corresponding to the number of metering chambers 18 and all dependent from the supporting member 12. The respective tubular discharge members 48 are so located that they are aligned with the cooperating metering chambers 18 when the metering member 16 is displaced to the left as seen in FIG. 1 by the driving cam 26.

The metering and discharging apparatus 10 is also equipped with a suitable agitating means illustrated in FIG. 1 as an air driven vibrator assembly 50 connected to an air pressure supply line 52 so that it is operated continuously. Since air driven vibrators of the type required for this purpose are available commercially, and since the features of such a vibrator form no part of the instant invention, the details of this vibrator will not be described or illustrated herein.

As illustrated, the vibrator assembly 50 is shown secured to a projecting portion of the container 42 adjacent to the supporting member 12. However, it will be evident that the vibrator assembly 50 may be secured directly to the supporting member 12 or to the housing for the metering member 16 if this part is formed separately from the supporting member. In any case, the vibrator assembly 50 will most effectively maintain the flow of the dry particulate material into the metering chambers 18 in the proper quantities if it is connected to and operable upon a portion of the metering and discharging apparatus 10 closely adjoining the metering member 16.

The metering and discharging apparatus 10 is also equipped with a pulsing assembly generally designated by reference numeral 60 illustrated in FIG. 1 including a plurality of conduits 62 connected to the supporting member 12 so that they discharge through their respective outlet orifices 64 into the upper ends of the respective metering chambers 18 when these metering chambers are disposed in alignment with the tubular discharge members 48. The respective conduits 62 are connected by means of manifold 66 to an air pressure supply line 67 through a normally closed valve V2 controlled by a solenoid S2 which is energized by a normally closed limit switch LS2 periodically allowed to close by control cam 68 secured to rotatable shaft 28 included in the drive train described further below.

The portions of an encapsulating machine represented schematically in FIG. 1 include a capsule forming die assembly generally designated by the reference numeral 100 in which a frame assembly 102, including one or more elongated die block supporting rods 104, is arranged to support a pair of opposed reciprocating die blocks 106 including openings 108 therethrough slidably engaging the rods 104 with a biasing spring 110 encircling each rod 104 tending to force the respective die blocks 106 apart.

The respective die blocks 106 are threadably engaged by adjustment screws 112 secured by locknuts 113 so that the die blocks 106 may be moved through the desired stroke by a pair of driving cams 116 supported by the frame assembly 102 and respectively secured to rotatable shafts 118a and 118b by keys 119 so that their cam surfaces 114 bear against the respective adjustment screws 112.

Each of the die blocks 106 supports a number of annular dies 122 corresponding to the number of tubular discharge members 48 so that the respective dies 122 reach the positions illustrated in FIG. 1 at the end of the stroke through which the die blocks 106 are moved by the driving cams 116. Each set of annular dies 122 supports a flat pressure plate 124 provided with a series of openings 126 therethrough which accommodate the dies 122 on which each pressure plate 124 is slidably supported.

Each pressure plate 124 is also provided with a series of semi-circular channels in its flat face extending from the upper edge of the plate to the respective openings 126, so that opposing pairs of semi-circular channels on the respective pressure plates 124 together encircle the respective tubular discharge members 48. The respective pressure plates 124 are biased toward each other by a plurality of biasing springs 128 interposed between each pressure plate and the adjoining die block 106.

The capsule knockout plugs 132 supported within the annular dies 122 are normally maintained in fixed positions relative to the respective die blocks 106 by the coaction between the shoulders 134 and the biasing springs 136 constrained by the pins 138. The selective displacement of the respective knockout plugs 132 relative to the associated annular dies 122 is controlled by a pair of stop blocks 140 mounted slidably within the respective die blocks 106, but normally maintained in the relative positions illustrated in FIG. 1 by means of plungers 142 threadably engaged with the respective stop blocks 140 and projecting through the respective die blocks 106 as shown in FIG. 1.

The plungers 142 and the attached stop blocks 140 are maintained in the positions shown in FIG. 1 by biasing springs 144, and each plunger 142 is provided with an adjustable stop screw 146 secured by a locknut 148. Each stop screw 146 is positioned so that it engages the frame assembly 102 or a stop fixedly secured to the frame 102 when the die blocks 106 have completed a predetermined portion of their return strokes produced by one or more biasing springs 110.

The enlarged outer ends of the knockout plugs 132 fitted slidably within the annular dies 122 are grooved on their peripheries as shown in FIG. 1 or otherwise relieved to admit air to the chambers at the inner ends of the annular dies 122 substantially closed by the plugs 132, and these chambers are connected to a suitable vacuum pump through vacuum lines 150 and thence through a normally closed valve V1 controlled by solenoid S1 actuated by a normally open limit switch LS1 periodically held closed by control cam 152 secured to rotatable shaft 118.

FIG. 1 also includes a schematic representation of a portion of a typical arrangement for feeding sheets of gelatin G through an encapsulating machine by means of an opposed pair of feeding rollers 160 with their surfaces shaped and spaced to accommodate the tubular discharge members 48. The respective rollers 160 may be coupled together for intermittent rotation in opposite directions by means of the gears 162 illustrated in FIG. 1 or other suitable means so that the gelatin sheets G may be advanced together in timed relation to the operation of the reciprocating dies by a suitable intermittent feed mechanism coupled to the drive train described further below. In FIG. 1 this intermittent feed is illustrated schematically as an eccentric 164 rotatable with the drive train coupled by means of a link 166 to the driving element of an over-running clutch 168 with its driven element coupled to one of the feeding rollers 160.

Since the drive train for operating the apparatus comprising the instant invention may be provided by additions to or suitable modification of the existing drive train for the apparatus with which it is associated in a given operation, for example an encapsulating machine of the type illustrated and described in detail in U.S. Patent 2,549,327, and since the details of this drive train form no part of this invention, FIG. 1 simply includes schematic representations of various driving cams and control cams shown as mounted upon a rotatable shaft 28 and on rotatable shafts 118a and 118b in the proper angular relationship for rotation as indicated by the respective arrows.

However, it will be evident that the respective cams may in fact be supported on various different elements of a drive train which are operatively interconnected to produce properly coordinated cyclic operations of the various components driven or controlled by the respective cams.

Likewise, since details of such units form no part of the instant invention, the sources of air pressure at various levels for various uses is not illustrated, the main drive motor M1 controlled by switch SW1 is illustrated schematically, and the vacuum pump P is illustrated schematically as driven by motor M2 controlled by switch SW3.

It will be evident that the apparatus described herein can be arranged to deliver different precisely controlled predetermined unit quantities of a dry particulate material by suitable variation of the volume of each metering chamber 18 in the metering member 16. For example, this change may be accomplished by substituting for a given metering member 16 another metering member 16 provided with metering chambers 18 having a different volume. Since the length of the respective metering chambers 18 is most conveniently maintained constant, a change in volume can be effected by changing the diameter of the metering chambers 18 in different metering members 16. However, it has been noted that most efficient operation of this apparatus is assured by providing passages 46 through the supporting member 12 at least as long as the metering chambers 18 in the metering member 16 and having a diameter equal to the diameter of the largest metering chambers 18 to be use in a given apparatus of the type described in this application.

FIGS. 2 and 3 illustrate another embodiment of the instant invention incorporating a different agitating means particularly well suited for use with very fine dry powdered material. In addition, FIGS. 2 and 3 and FIG. 4 illustrate a modified metering member selectively adjustable to vary the volume of material metered and discharged by the apparatus comprising the instant invention.

Noting that the general arrangement of major components in the embodiment of the instant invention illustrated in FIGS. 2 and 3 generally corresponds to the arrangement of major components in the embodiment illustrated in FIG. 1, it will be evident that the apparatus comprising the instant invention can be modified as required in any given application by substituting various components of one embodiment of this invention for coresponding components of the other embodiment of this invention.

From inspection of the showing in FIGS. 2 and 3, it will be evident that this embodiment includes a container 42' enclosed by a cover 44 and adjustably supported on suitable supporting means 12' including relatively fixed supporting brackets 12a, a relatively adjustable constraining portion 12b, and a relatively fixed supporting portion 12c with a plurality of tubular discharge members 48 secured to and dependent from the supporting portion 12c.

The embodiment of the instant invention illustrated in FIGS. 2 and 3 includes an agitating means generally designated by the reference numeral 70 including an elongated housing 72 interposed between the bottom of the container 42' and the constraining portion 12b of the supporting means 12' and provided with a vertical passage 74 therethrough interconnecting the slot in the bottom of the container 42' and a number of passages 46 through the constraining portion 12b corresponding to the number of metering chambers 18' in metering member 16'. The opposite sides of the housing 72 are provided with openings 76 therethrough shaped to receive a pair of air chambers 78 each enclosed on the side adjacent to the passage 74 by a diffuser 80 which consists of a layer of porous material and each connected to an air pressure supply line 82. In order to equalize the flow of air through different portions of each of the diffusers 80, it may be necessary to screen a portion of each diffuser 80 opposite each air pressure supply line 82 with a solid or perforate baffle 84.

While the agitating means comprising an air driven vibrator assembly 50 is effective to maintain the flow of relatively large generally spherical pellets through the apparatus described here, an agitating means of this type tends to compact fine powders so that the flow of such powders through this apparatus is not maintained at a constant level. Accordingly, the agitating means 70 comprising an aerator assembly as described above and illustrated in FIGS. 2 and 3 of the drawings is substituted for the air driven vibrator assembly 50 when the dry material being metered and discharged by this apparatus is a fine powder.

For some types of relatively large dry particulate material, the metering and discharging operation is performed most satisfactorily using both the agitating means 70 and the air driven vibrator assembly 50. For this reason, the embodiment of the instant invention illustrated in FIGS. 2 and 3 may be provided with a mounting bracket 54 for the air driven vibrator assembly 50 secured to the housing 72 as shown in FIG. 3 or elsewhere on this apparatus close to the metering member 16'.

The embodiment of the instant invention illustrated in FIGS. 2 and 3 also includes a modified metering member generally designated by the reference numeral 16' mounted slidably between the supporting portion 12c and the constraining portion 12b of the supporting means 12' for reciprocating movement produced by the cam follower 20' rotatably supported on the cam follower pivot 22' secured to the metering member 16' by any suitable means such as the arm 38 secured by screws 39 as illustrated in FIG. 3. The cyclic displacement of the cam follower 20' is produced by the cam surface 24' of the driving cam 26' secured to the shaft 28 for rotation therewith, and return movement of the metering member 16' to the right as seen in FIG. 3 is produced by the biasing spring 32 constrained by end block 34' secured by means of retaining screws 36' to the base portion 12a of the supporting means 12'.

The modified metering member 16' illustrated in FIGS. 2 and 3 and in detail in FIG. 4 is arranged to provide metering chambers 18' selectively adjustable to different volumes as required for different operations. As illustrated in FIGS. 2, 3 and 4, the metering member 16' arranged to provide this feature consists of a lower elongated relatively fixed base portion 16a slidable upon the upper surface of supporting portion 12c of the supporting means 12' and an elongated relatively movable volumetric control portion 16b slidable along the under surface of the constraining portion 12b of the supporting means 12'.

The base portion 16a and the volumetric control portion 16b may be maintained in alignment for reciprocating movement together as a unit by any suitable means such as the guide pins 90 which may be secured in the volumetric control portion 16b and may be slidable in holes through the base portion 16a as illustrated in FIG. 2. Each of the metering chambers 18' consists of vertically aligned holes 92a and 92b through the respective portions 16a and 16b of the metering member 16' interconnected notwithstanding limited relative displacement of the respective portions 16a and 16b by a thin walled sleeve 96 which may be secured within the hole 92b through the volumetric control portion 16b and be slidable within the hole 92a through the base portion 16a. The desired relative positions of the base portion 16a and the volumetric control portion 16b of the metering member 16' are maintained for any given setting of the constraining portion 12b of the supporting means 12' by a plurality of biasing springs 98 which may conveniently be seated in enlarged recesses concentric of selected holes 92a and 92b through the respective portions 16a and 16b of metering member 16' as illustrated in FIGS. 2, 3 and 4.

The positioning means illustrated in FIGS. 2 and 3 for adjusting the constraining portion 12b of the supporting means 12', generally designated by the numeral 170, includes a U-shaped supporting bracket 172 secured to the container 42' and provided with ears 174 each fitted with a pair of stop screws 176 threadably engaged therewith and secured by locknuts 178 so that they bear against the upper surface of an ear 180 projecting horizontally from one of the supporting brackets 12a. The positioning means also includes a pair of retaining screws 182 each surrounded by a biasing spring 184 and threadably engaged with the ear 180 projecting from one of the supporting brackets 12a. Since each of the retaining screws 182 passes through a hole in one of the ears 174 of the supporting bracket 172 with its enlarged head above that ear 174, these screws 182 may be tightened to maintain stop screws 176 in engagement with the ears 180 and thereby maintain the container 42' in fixed relation to the supporting portion 12c of the supporting means 12' with the constaining portion 12b positioned to maintain the desired relationship between the portions 16a and 16b of the metering member 16'.

The vertical alignment of the constraining portion 12b and the supporting portion 12c of the supporting means 12' is maintained by brackets 186 secured to the supporting portion 12c and provided with vertical slots to receive screws 188 threadably engaging the constraining portion 12b and which may be loosened to permit vertical adjustment of the constraining portion 12b and then be tightened to secure the constraining portion 12b in the desired position for a given operation.

In order to operate the apparatus illustrated in FIG. 1, it is necessary to supply air pressure at the proper levels to the vibrator assembly 50 through the air pressure supply line 52 and to the manifold 66 through the air pressure supply line 67, to energize motor M2 by closing switch SW3, to energize solenoid S1 by closing switch SW2, and to energize drive motor M1 by closing switch SW1.

Noting that the annular dies 122 are shown in FIG. 1 at the end of the capsule forming and sealing stroke, continued counter-clockwise rotation of the driving cams 116 with shafts 118a and 118b will allow biasing springs 110 to force the die blocks 106 apart first to withdraw the opposed annular dies 122 and then to withdraw the spring biased pressure plates 124 limited in their displacement relative to the respective die blocks 106 by suitable limit stops not illustrated since stop screws used for this purpose are clearly illustrated in U.S. Patent 2,513,581 illustrating and describing the type of capsule forming die assembly shown in FIG. 1.

Meanwhile, concurrent counter-clockwise rotation of the control cam 152 with shaft 118a will release normally open limit switch LS1 to deenergize solenoid S1 allowing normally closed valve V1 to close so that a vacuum is no longer applied to the chambers behind the knockout plugs 132. As the die blocks 106 are withdrawn, the stop screws 146 limit the travel of the knockout plugs 132 with the die blocks 106 so that the knockout plugs are displaced within the annular dies 122 to dislodge the newly formed capsules therefrom.

Concurrent counter-clockwise rotation of the eccentric 164 effects further displacement of the link 166 to produce continued clockwise rotation of the driving element of over-running clutch 168 without producing rotation of the driven element of over-running clutch 168 until after the annular dies 122 and the pressure plates 124 supported by the die blocks 106 are disengaged from the gelatin sheets G and the capsules formed thereby. However, after the eccentric 164 passes the low point in its circular path continued counter-clockwise rotation of the eccentric 164 through about 180° displaces the link 166 so that the driving element of over-running clutch 168 is rotated counter-clockwise to rotate the driven element of the over-running clutch 168 to produce counter-clockwise rotation of the feeding roller 160 coupled thereto and concurrent clockwise rotation of the other feeding roller 160 to feed the gelatin sheets G downwardly into the space between the opposed annular dies 122.

After new sections of the gelatin sheets G are positioned between the annular dies, the continued counter-clockwise rotation of the driving cams 116 initiates the next capsule forming stroke by advancing the die blocks 106 sufficiently to clamp the gelatin sheets G between the pressure plates 124 and around the lower ends of the tubular discharge members or arbors 48 which extend into the spaces formed by the opposed pairs of channels 130 in the flat faces of the respective pressure plates 124.

At this point in the cycle, the normally open limit switch LS1 is closed by continued rotation of the control cam 152 to energize solenoid S1 to open valve V1 so that a vacuum is applied to the chambers behind the knockout plugs 132. The resultant differential pressure on opposite sides of the portions of the gelatin sheets G covering the outer ends of the annular dies 122 draws these portions of the gelatin sheets into the space within the annular dies in front of the plugs 132.

The driving cam 26 is so shaped and positioned on shaft 28 that during the portion of the operating cycle described above, the metering member 16 has remained in the position shown in FIG. 1 with the respective metering chambers filled by the dry particulate material supplied from the container 42, and the continuous operation of the air driven vibrator assembly 50 while the metering member 16 remains in this position assures that each of the metering chambers 18 is fully filled with the desired quantity of capsule filling material. However, with continued counter-clockwise rotation of the driving cam 26, the cam surface 24 now displaces the cam follower 20 and thus the metering member 16 so that the respective metering chambers 18 are disposed in vertical alignment with the respective tubular discharge members 48.

At the same point in the cycle concurrent clockwise rotation of the control cam 68 allows the normally closed limit switch LS2 to close energizing solenoid S2 briefly to open normally closed valve V2 to admit low pressure air to the manifold 66 and thence through conduits 62 to outlet orifices 64 located above the respective metering chambers 18 so that the pulses of air discharged through the respective outlet orifices 64 discharge the material contained in the respective metering chambers 18 through the respective tubular discharge members 48 into the space enclosed by the portions of the respective gelatin sheets G drawn into the outer ends of the respective annular dies 122.

Thereafter, continued couter-clockwise rotation of the driving cams 116 advances the respective annular dies 122 to the positions shown in FIG. 1 to close and seal the filled capsules thereby completing an operating cycle.

When the dry particulate material to be metered and discharged is a fine powder, the agitating means comprising an air driven vibrator assembly tends to settle and compact the powder to such an extent that it forms a bridge within the container 42 with the result that the desired quantity of material is not delivered to the metering member. For such applications, the vibrator assembly 50 can be replaced with an agitating means 70 as illustrated in FIGS. 2 and 3 in which air under very low pressure is continuously supplied to the passage 74 through diffusers 80 so that powder adjacent the bottom of container 42 is maintained loose enough to flow into the metering member in the desired quantity. With the substitution of the agitating means 70 illustrated in FIGS. 2 and 3 for the vibrator assembly 50, shown in FIG. 1, the operation of the apparatus comprising the instant invention is still as described above for the embodiment illustrated in FIG. 1.

While the metering member 16 illustrated in FIG. 1 is entirely satisfactory for metering and discharging a given quantity of a given dry particulate material, it is necessary to rework the metering member to change the volume of the metering chambers whenever a different quantity of material is required and sometimes even when the same quantity of a different kind of material is required. Accordingly, the adjustable metering member 16' illustrated in FIGS. 2, 3, and 4, is preferred in any application where it is frequently necessary to change or make minor adjustments of the volume of the metering chambers 18' since such changes and adjustments can be made quickly and accurately without dismantling the apparatus embodying the instant invention.

When the apparatus embodying the instant invention includes an adjustable metering slide 16', the desired adjustment can be effected quickly by first releasing the screws 188 engaging the slotted brackets 186 and then by making suitable adjustments of the stop screws 176 and the retaining screws 182 to adjust the position of the container 42' and thus the position of the constaining portion 12b relative to the supporting portion 12c of the supporting means 12'. This adjustment is facilitated by providing a scale on the supporting bracket 172 and a cooperating pointer attached to one of the supporting brackets 12a as shown in FIG. 3.

Aside from the adjustment of the metering member 16' in the manner described above, the operation of the inventive apparatus when it is equipped with the adjustable metering member 16' is the same as the operation of the embodiment illustrated in FIG. 1 described in detail above.

The continuously operating agitating means 70 illustrated in FIGS. 2 and 3 which produces an aerating action is fully satisfactory as the sole means of maintaining the flow of fine powders through the inventive apparatus, and the air driven vibrator assembly 50 used as illustrated in FIG. 1 is fully satisfactory as the sole means of maintaining the flow of relatively large generally spherical particles through the inventive apparatus. However, the satisfactory flow of some relatively large particles through the inventive apparatus is fully assured only when the agitating means 70 is augmented by the vibrator assembly 50 which may be attached to the mounting bracket 54 illustrated in FIG. 3.

By way of further illustration, it may be noted that the apparatus illustrated and described herein has been used successfully to meter and discharge dry particulate material rapidly for delivery to an encapsulating machine of the type described and illustrated in Patent Nos. 2,513,581 and 2,549,327 both for relatively large pellets of 16 mesh and finer and for powders 80 mesh and finer using a vacuum on the capsule forming die cavities of from 2 to 10 inches of mercury varied as required by various factors including the size of the dies and the thickness of the gelatin sheets. The mesh sizes referred to here are from the United States fine sieve series.

The low constant pressure supplied to the pulsing means for accelerating the discharge of the dry particulate material from the metering member has been varied from 2 pounds per square inch to 8 pounds per square inch depending on the size and quantity and other properties of the dry particulate material being processed, and the much lower constant pressure supplied to the agitating means comprising an aerator has been maintained at a level between 2 ounces per square inch and 16 ounces per square inch, again depending upon the size and other properties of the dry particulate material being metered and discharged.

The speed with which a dry particulate material can be measured or metered and then discharged is increased substantially by the provision in the apparatus described and illustrated herein of the pulsing means operable periodically to direct a controlled quantity of gas at a predetermined low pressure against the dry particulate material contained in a measuring or metering chamber so that the discharge of this material is accelerated.

The flexibility of the apparatus illustrated and described herein is greatly enhanced by the provision of a measuring or metering member readily adjustable to vary the volume of dry particulate material being metered and discharged.

The sustained reliable operation of the apparatus described and illustrated herein is assured with various sizes and types of dry particulate material by the use of one or more agitating means arranged to assure a continuing flow of such material from the container to the measuring or metering member in the proper quantity.

Thus, the instant invention provides apparatus capable of reliable sustained operation to meter and discharge successive precisely controlled quantities of dry particulate material for various applications including, but by no means limited to, the encapsulation of such material at a sustained rapid rate in soft shelled gelatin capsules.

Since various details of this invention are subject to modification, it is to be understood that the embodiments thereof described above and shown in the accompanying drawings are to be interpreted as illustrative only and not in a limiting sense, and that the sope of this invention is defined by the claims appended hereto.

What is claimed is:

1. Apparatus for metering and discharging successive precisely controlled quantities of dry particulate material comprising a supporting means, a container for dry particulate material mounted upon said supporting means, a tubular member dependent from said supporting means, a measuring member having a measuring chamber extending substantially vertically therethrough, said measuring member being mounted within said supporting means for movement between a first position to receive a predetermined precisely controlled quantity of dry particulate material from said container through the top of the measuring chamber otherwise fully enclosed in the first position and a second position to discharge the same predetermined precisely controlled quantity of dry particulate material through the bottom of the measuring chamber into said tubular member, an agitating means connected to said supporting means and operative continuously to agitate a dry particulate material as it passes from said container into said measuring member, a pulsing means connected to said supporting means operative periodically to discharge a quantity of pressurized gas through an orifice above said measuring member against the dry particulate material contained in said measuring member while said measuring member is disposed in its second position to accelerate the discharge of the dry particulate material from said measuring member into said tubular member, and a drive means operative to move said measuring member back and forth between its first and second positions, and to actuate said pulsing means when said measuring member is disposed in its second position.

2. Apparatus for metering and discharging successive precisely controlled quantities of dry particulate material comprising a supporting means, a container for dry particulate material mounted upon said supporting means, a predetermined number of tubular discharge members dependent from said supporting means, a measuring member provided with the same predetermined number of measuring chambers extending therethrough each having an upper inlet opening and a lower outlet opening, said measuring member being mounted within said supporting member for sliding movement between a first position in which each measuring chamber is disposed with its inlet opening open and its outlet opening fully closed to receive a predetermined precisely controlled quantity of dry particulate material from said container and a second position in which each measuring chamber is disposed with its outlet opening open to discharge a predetermined precisely controlled quantity of dry particulate material into one of said tubular discharge members, agitating means connected to said supporting means and operative continuously to agitate a dry particulate material as it passes from said container into said measuring member by gravity feed, pulsing means connected to said supporting means and including the same predetermined number of outlet orifices adjacent the inlet openings of the several measuring chambers each arranged to discharge a controlled quantity of gas at a predetermined low pressure against the dry particulate material contained in one measuring chamber while said measuring member is disposed in its second position to accelerate the discharge of the dry particulate material from said measuring member, and a drive means operative to move said measuring member back and forth between its first and second positions, and to actuate said pulsing means when said measuring member is disposed in its second position.

3. Apparatus for metering and discharging successive precisely controlled quantities of dry particulate material comprising a supporting means, a container for dry particulate material mounted upon said supporting means, a predetermined plurality of tubular discharge members dependent from said supporting means, a metering member provided with the same predetermined plurality of metering chambers extending therethrough and mounted within said supporting member for movement between a first position in which each metering chamber is disposed to receive a predetermined precisely controlled quantity of dry particulate material from said container and a second position in which each metering chamber is disposed to discharge a predetermined precisely controlled quantity of dry particulate material into one of said tubular discharge members, an agitating means connected to said supporting means and operable continuously to agitate a dry particulate material as it passes from said container into said metering member, pulsing means connected to said supporting means operable periodically to discharge a controlled quantity of gas at a predetermined low pressure against the dry particulate material contained in one metering chamber while said metering member is disposed in its second position to accelerate the discharge of the dry particulate material from the metering member, and a drive means operable to move said metering member back and forth between its first and second positions, and to actuate said pulsing means when said metering member is disposed in its second position.

4. Apparatus as described in claim 3, wherein each of the respective metering chambers within said metering member has a predetermined cross section shape and area and a predetermined length, and wherein said supporting means includes a corresponding number of passages aligned with the respective metering chambers when said metering member is disposed in its first position, said passages each having a cross section shape corresponding to that of each metering chamber, each having a cross section area at least as great as that of each metering chamber, and each having a length at least as great as that of each metering chamber.

5. Apparatus as described in claim 3, wherein each of the respective metering chambers within said metering member has a predetermined length and a circular cross section with a predetermined area, and wherein said supporting means includes a corresponding number of passages aligned with the respective metering chambers when said metering member is in its first position, said passages each having a length greater than that of each metering chamber and a circular cross section with an area at least as great as that of each metering chamber.

6. Apparatus as described in claim 3, wherein said agitating means comprises an air driven vibrator assembly secured to said supporting means adjacent to said metering member.

7. Apparatus as described in claim 3, wherein said agitating means comprises an aerator mounted between said container and said supporting means and arranged to direct a flow of a gas at a predetermined low pressure against dry particulate material enclosed in said container and passing therefrom into said metering member.

8. Apparatus as described in claim 3, wherein said agitating means includes both an air driven vibrator assembly secured to said supporting means adjacent to said metering member, and an aerator mounted between said container and said supporting means and arranged to direct a flow of gas at a predetermined low pressure against dry particulate material enclosed in said container and passing therefrom into said metering member.

9. The method of metering and discharging a precisely measured quantity of dry particulate material comprising opening the top of a given otherwise fully closed volumetric metering chamber so as to receive from a given relatively elevated source of supply a quantity of dry particulate material, meanwhile agitating the dry particulate material as it is passed from the given source of supply into the given metering chamber to insure that the given metering chamber is completely filled, closing the top of the given metering chamber to enclose a predetermined precisely measured quantity of dry particulate material, opening the bottom of the given metering chamber so as to discharge the quantity of dry particulate material contained by the given metering chamber, and injecting into the given metering chamber through an orifice in the otherwise closed top thereof a pulse of pressurized gas to accelerate the discharge of all of the dry particulate material from the bottom of the given metering chamber.

10. The method of rapidly metering and discharging a multiplicity of precisely measured quantities of dry particulate material comprising cyclically opening the tops of a given number of volumetric metering chambers so as to receive from a given source of supply a predetermined quantity of dry particulate material in each metering chamber, meanwhile continuously agitating the dry particulate material as it is passed from the given source of supply into each of the given number of metering chambers to insure that each of the given number of metering chambers is completely filled each time it is opened at the top to receive a quantity of dry particulate material, cyclically completely enclosing each of the given number of metering chambers to enclose predetermined precisely measured quantities of dry particulate material, cyclically opening the bottoms of the given number of metering chambers so as to discharge the quantity of dry particulate material contained by each of the given number of metering chambers into one of an equal number of individual outlet conduits each aligned with the bottom of one of the give number of metering chambers, and cyclically injecting through the top of each of the given number of metering chambers a pulse of pressurized gas to accelerate the discharge of all of the dry particulate material contained therein from each of the given number of metering chambers each time it is opened to discharge the precisely measured quantity of dry particulate material contained therein.

11. Apparatus for metering and discharging successive precisely controlled quantities of dry particulate material comprising a supporting means, a container for dry particulate material mounted upon said supporting means, a tubular member dependent from said supporting means, a measuring member having an elongated measuring chamber extending substantially vertically therethrough, said measuring member being mounted within said supporting means with opposite side surfaces of said measuring member maintained in sliding engagement with opposed complementary surfaces of said supporting means for movement between a first position in which the measuring chamber is opened only at the upper end thereof and thereby receives a predetermined precisely controlled quantity of dry particulate material from said container and a second position in which the measuring chamber is opened at the lower end thereof and thereby discharges the same predetermined precisely controlled quantity of dry particulate material into said tubular member, an agitating means connected to said supporting means and operative continuously to agitate a dry particulate material as it passes from said container into said measuring member, a pulsing means connected to said supporting means operative to discharge a quantity of pressurized gas against the dry particulate material contained in said measuring member while said measuring member is disposed in its second position to accelerate the discharge of the dry particulate material from said measuring member, and a drive means operative to move said measuring member back and forth between its first and second positions and to actuate said pulsing means when said measuring member is disposed in its second position.

References Cited by the Examiner
UNITED STATES PATENTS 2,314,031   3/1943   Colburn _____ 222—194 X
2,670,101   2/1954   Heisterkamp et al. _ 222—194 X
2,771,225   11/1956  Perkins _____ 222—276 X RAPHAEL M. LUPO, *Primary Examiner.*

STANLEY H. TOLLBERG, *Examiner.*